US007242125B2

(12) United States Patent
Schneider et al.

(10) Patent No.: US 7,242,125 B2
(45) Date of Patent: Jul. 10, 2007

(54) DEVICE FOR THE INSULATION OF STATOR SLOTS

(75) Inventors: Helmut Schneider, Zimmern-Flözlingen (DE); Ulrich Kreiensen, Deisslingen (DE)

(73) Assignee: Minebea Co., Ltd., Kitasaku-Gun, Nagano-Ken (JP)

(*) Notice: Subject to any disclaimer, the term of this patent is extended or adjusted under 35 U.S.C. 154(b) by 0 days.

(21) Appl. No.: 11/178,460

(22) Filed: Jul. 12, 2005

(65) Prior Publication Data

US 2007/0001525 A1 Jan. 4, 2007

(30) Foreign Application Priority Data

Jul. 13, 2004 (DE) ..................... 20 2004 010 956

(51) Int. Cl.
*H02K 3/34* (2006.01)
*H02K 5/00* (2006.01)
*H02K 7/00* (2006.01)

(52) U.S. Cl. ........................................ 310/194; 310/43

(58) Field of Classification Search ................. 310/43, 310/71, 194, 215

See application file for complete search history.

(56) References Cited

U.S. PATENT DOCUMENTS 3,984,712 A 10/1976 Hill
5,243,246 A 9/1993 Sakamoto
6,984,911 B2 * 1/2006 Horie et al. ................ 310/194
6,992,417 B1 * 1/2006 Yamada ...................... 310/194
2001/0006312 A1 * 7/2001 Sheeran et al. ............... 310/71

FOREIGN PATENT DOCUMENTS

| | | | |
|---|---|---|---|
| DE | 3209864 | | 9/1983 |
| EP | 10304613 | | 11/1998 |
| EP | 1 193 829 A2 | | 4/2002 |
| EP | 1 404 007 A1 | | 3/2004 |
| GB | 2081027 | | 2/1982 |
| JP | 61218335 A | * | 9/1986 |
| JP | 03159535 A | * | 7/1991 |
| JP | 09182341 A | * | 7/1997 |

OTHER PUBLICATIONS

A corresponding English abstract has been provided for the document.

* cited by examiner

*Primary Examiner*—Tran Nguyen
(74) *Attorney, Agent, or Firm*—Duane Morris, LLP

(57) ABSTRACT

The invention relates to a device for the insulation of the stator slots of an electric machine that has a stator having a plurality of stator poles and stator slots located between the stator poles, comprising an insulating body that has moldings adapted to the shape of the stator slots and can be slid onto the stator in an axial direction, and a cover piece that can be connected to an end face of the insulating body, in order after the windings have been applied to the insulating body, to carry the windings (36) at the end face of the stator and to cover them.

18 Claims, 4 Drawing Sheets

Figure 1:
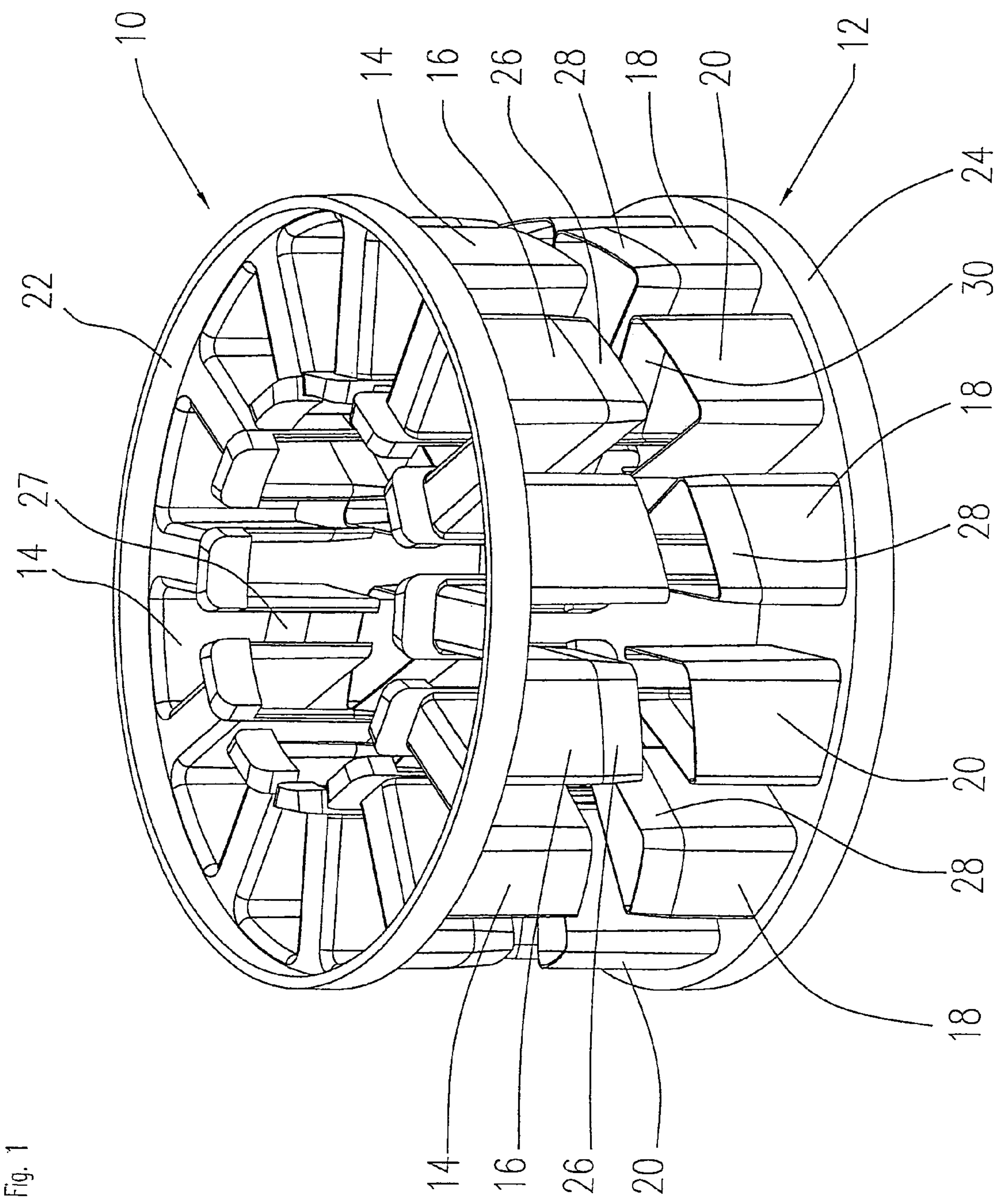

10
12
14
16
26
28
18
20
22
24
30
27

42
36
40
34
24
32
12
34
10
38
44
46
44
46
38

DEVICE FOR THE INSULATION OF STATOR SLOTS

The instant disclosure claims the filing-date benefit of German Utility Model Application No. 20 2004 010 956.5 filed Jul.13, 2004, the specification of which is incorporated herein in its entirety.

FIELD OF THE INVENTION

The invention relates to a device for the insulation of the stator slots of an electric machine that has a stator having a plurality of stator poles and stator slots located between the stator poles

BACKGROUND OF THE INVENTION

A main area of application of the invention is in the field of brushless DC motors and other permanent magnet motors which are configured as inner rotor motors or as outer rotor motors. The invention, however, is not limited to this area and can be generally applied to any kind of electric motor or generator.

Electric motors having an inner rotor configuration have a rotor arrangement that is mounted onto the shaft and comprises one or more permanent magnets, as well as a stator arrangement made up, for example, of a number of stacked metal laminations having an annular stator back yoke and stator poles, which sometimes are called “hammer” or “tooth”, protruding inwards from the stator back yoke. Phase windings are applied to the hammers. The rotor arrangement is inserted coaxially into the stator arrangement. In the case of outer rotor motors, the rotor coaxially encloses the stator.

Before the stator hammers are wound with the phase windings of the electric machine, the hammers have to be electrically insulated. To this effect, it is known to place coil carriers made of plastic onto the hammers. It is also known to coat the hammers and the stator slots located between the hammers with a plastic coating. In the prior art, moreover, two-piece insulating bodies made of plastic are known that have a first and a second part having moldings that are adapted to the shape of the hammers and the stator slots which can be slid onto the stator on both sides in an axial direction. The two parts of the insulating body are dimensioned in the axial direction so that once they are mounted onto a stator, their moldings, adapted to the hammers and the stator slots, partly extend over the axial length of the stator slots and abut one another at their interfaces. Depending on the tolerances used during the manufacture of the two parts of the insulating body, a gap between the two parts can occur if they are shorter in total than the axial length of the stator; or it can also happen that the two parts of the insulating body overlap each other so that, due to the material thickness in the region of the overlap, an air gap between the insulating body and the stator is created when the two parts of the insulating body are longer in total than the axial length of the stator. A gap between the two parts of the insulating body can result in the hammers of the stator not being sufficiently insulated against the phase windings. Moreover, an air gap between the insulation and the stator material carries the risk that leakage current paths may be formed. Two-piece insulating bodies for stator slots which have a rebate or bevel in the region of the overlap are also known from the prior art.

In the electric machines of the prior art that have this kind of insulating body, it is common practice that after the stator has been wound, the winding heads and winding ends of the phase windings are individually bound and fixed to the stator or led away from the stator. This process is very labor intensive, the phase windings of the wound stator very often being arranged in a confused manner and it being difficult to identify exactly where the respective winding ends are led out of the stator.

It is the object of the invention to provide a device for the insulation of the stator slots of an electric machine that is simply constructed and clearly laid out and ensures perfect insulation of the stator slots.

SUMMARY OF THE INVENTION

The invention provides an insulating body that has moldings adapted to the shape of the stator slots. The insulating body can be slid onto the stator in an axial direction. A covering piece is provided at one end face of the insulating body in order, after windings have been applied to the insulating body, to carry the windings at the end face of the stator in a clearly arranged way and to cover them. In practice, after the insulating body has been mounted onto the stator, phase windings are wound around the stator poles, which fill the stator slots and form a winding head at the two end faces of the stator. In order to cover the winding heads and to combine and carry the winding ends in an orderly way, the covering piece is provided at the end face of the stator from which the winding ends are to be led out.

The covering piece can be designed, for example, as an annular cover plate that is held on the insulating body with a spacing to the moldings in order to enclose the winding head between the insulating body and the cover plate. Such cover plates could also be provided at both end faces of the stator. This embodiment has the advantage that the device for the insulation of the stator slots can simultaneously take on the function of covering the winding head so that the windings are carried (guided) on the outside of the stator, they are protected from outside influences and other motor parts can be fastened to the stator.

The covering piece preferably comprises at least one channel to carry the winding wires, means for mounting parts of the motor electrics, such as a circuit board, as well as means of fastening the winding wire ends. These measures go to provide a particularly simple and clearly laid out construction of the electric motor in which various components of the motor electrics and electronics can be carried and fastened on the cover plate, making it unnecessary to provide any extra retaining or clamping pieces for these components. It is not necessary to tie the winding heads and the winding wire ends individually or to fix and carry them in any other way on the stator.

In a particularly suitable embodiment of the invention, the covering piece is connected to the part of the insulating body by snap hooks.

The invention further provides a two-piece insulating body that has a first part and a second part having moldings adapted to the shape of the stator slots of the stator. The two parts of the insulating body can be slid onto the stator on both sides in an axial direction, each part of the insulating body being dimensioned in the axial direction so that after they have been slid onto the stator, the moldings adapted to the stator slots extend at least partially over the axial length of the stator slots and overlap one another in the axial direction. In the region in which the two parts of the insulating body overlap, a first group of moldings of the first part engage into the moldings of the second part located opposite, and a second group of moldings of the first part encompass moldings of the second part located opposite. In contrast to the prior art, the two parts of the insulating body do not adjoin each other with planar faces. They are also not designed for the first part to be inserted fully into a second part in an overlapping region, or vice versa. In fact, the two parts of the insulating body are so designed that in the region of overlap, one part of the moldings of the first part encompasses the corresponding moldings of the second part and another part of the molding of the first part is inserted into the corresponding moldings of the second part. For a stator having an even number of poles or slots, the moldings of the first and of the second part are preferably designed so that they are alternatively inserted into or encompass the corresponding opposing moldings of the respective other parts. This goes to create a particularly intimate contact between the two parts of the insulating body, and air pockets as well as air gaps in the region of overlap can be extensively eliminated. In a beneficial embodiment of the invention, the two parts of the insulating body are identical in construction and are slid one on top of the other in the region of overlap. This has the advantage that identical insulating bodies can be manufactured at low tool manufacturing costs.

In a preferred embodiment of the invention, the moldings of the first and the second group of the first part have an outer chamfer or inner chamfer respectively in the region of overlap and the corresponding opposing moldings of the second part have a complementary inner chamfer or outer chamfer respectively. Instead of an outer chamfer and an inner chamfer, an outer rebate or an outside step or an inner rebate or an inside step could also be provided at the edges facing each other of the moldings of the two parts of the insulating body. Making a rebate or a step in the region of overlap has the advantage that when the two parts of the insulating body are joined together, the insulating wall is always given a uniform thickness. From a manufacturing point of view, however, a rebate or a step have the disadvantage, particularly for thin wall thicknesses, that unsuitable flow paths are created in the injection molding process. The provision of chamfered regions of overlap creates a more favorable wall thickness geometry for the injection molding process, particularly if thin wall thicknesses are required. The moldings of the first and of the second part can also be designed in some other way with there being less material thickness in the region of overlap, so that after the two parts of the insulating body are joined together, a smooth, continuous wall is produced that fits evenly against the hammers and slots of the stator.

The different embodiments of the insulating body mentioned above have the advantage that after the two parts of the insulating body have been joined together, an even, continuous insulating layer is created that fits snugly against the slots and poles of the stator and insulates them in a reliable way without the risk of air pockets or gaps being formed.

In practice, after the insulating body has been mounted on the stator, phase windings are wound around the stator poles which fill the stator slots and form a winding head at each end face of the stator. A covering piece can be placed on the end face of the first or of the second part of the insulating body in order to cover the winding head at this end face of the stator after the windings have been applied.

The insulating body and the cover plate are preferably made from injection molded plastic parts.

SHORT DESCRIPTION OF DRAWINGS

Figure 2:
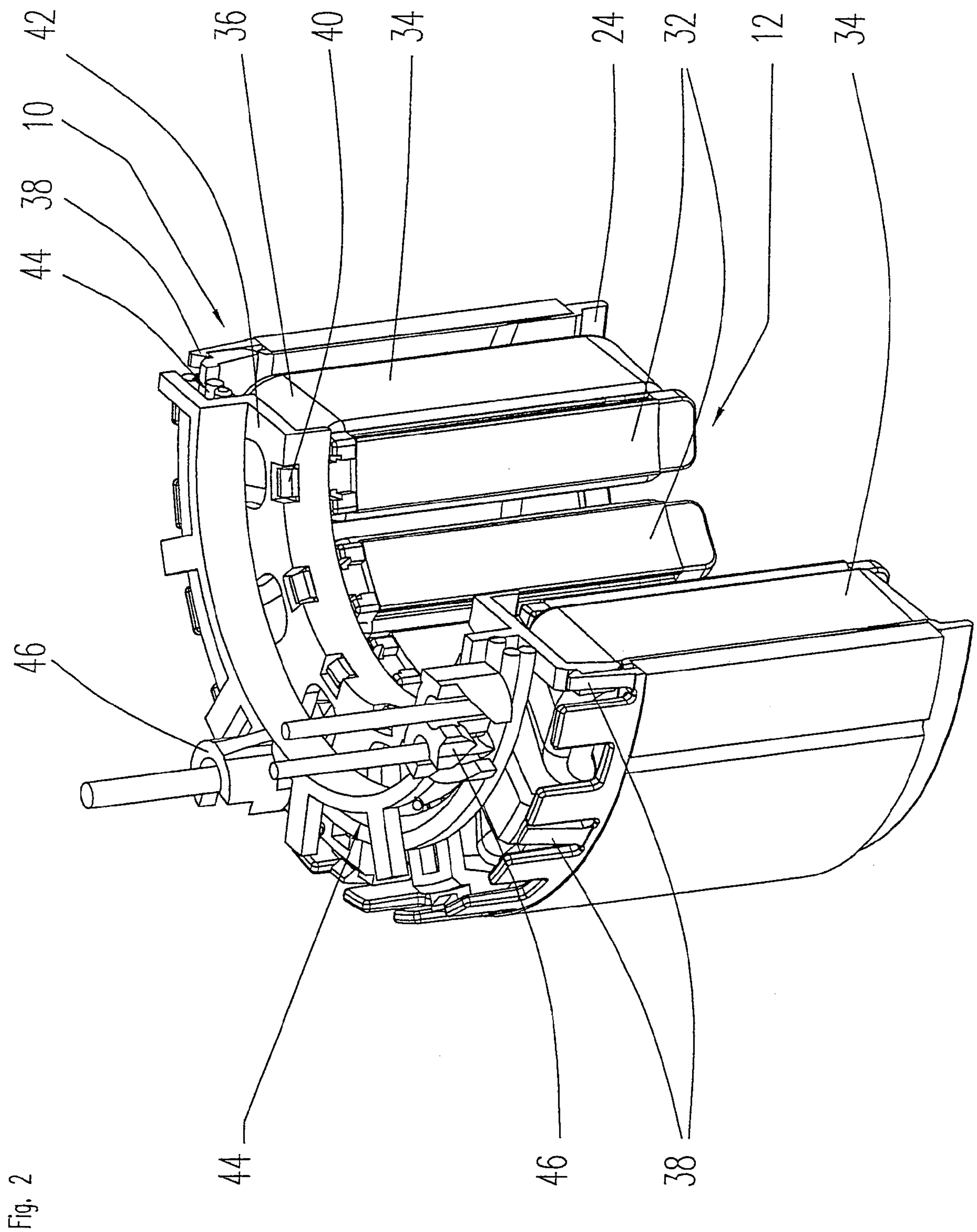
Figure 3:
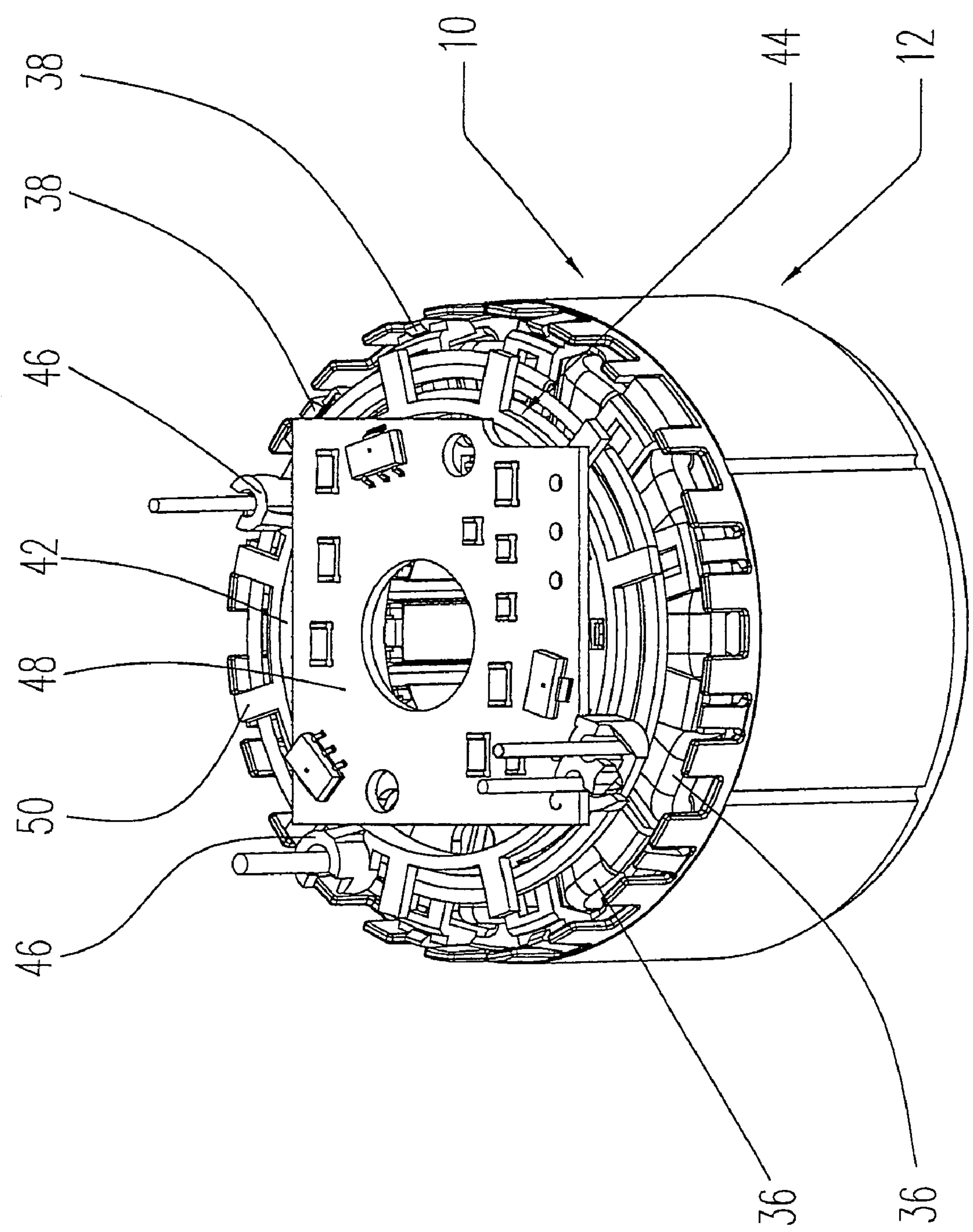
Figure 4:
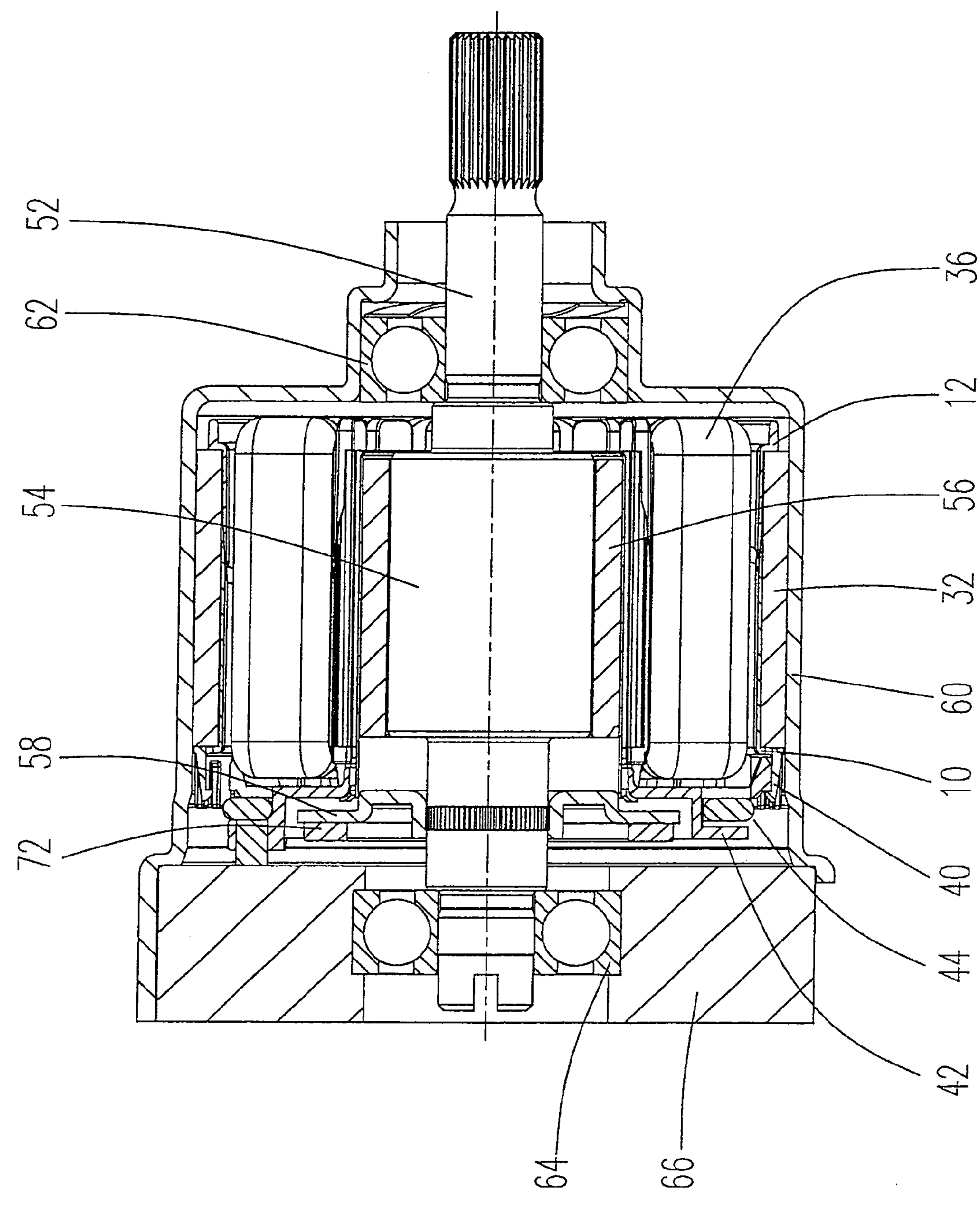

The invention is described in more detail below on the basis of preferred embodiments with reference to the drawings. The figures show:

FIG. 1 a perspective view of a two-piece insulating body according to the invention;

FIG. 2 a perspective, sectioned partial view of a stator on which an insulating device according to the invention is mounted;

FIG. 3 a perspective exterior view of a stator on which an insulating device according to the invention is mounted;

FIG. 4 a longitudinal view through an electric motor having an insulating device according to the invention.

DESCRIPTION OF PREFERRED EMBODIMENT

The invention is described below using a brushless DC motor having an inner rotor configuration as an example. The person skilled in the art, however, would realize that the principles of the invention can be applied to any type of electric motor or generator.

FIG. 1 shows a perspective view of a two-piece insulating body according to the invention. The insulating body comprises a first part 10 and a second part 12. Each of the two parts 10, 12 of the insulating body is provided with moldings 14, 16, 18, 20 which are adapted to the shape of the stator slots of a stator on which the insulating body 10, 12 is to be mounted. It can be seen from FIG. 1 that each of the moldings 14, 16, 18, 20 lines a stator slot completely, the side faces of the pole, or hammer, located between two stator slots being provided with an insulating sleeve through adjoining moldings. In the illustrated embodiment, the moldings 14, 16 of the first part 10 and the moldings 18, 20 of the second part 12 are respectively connected by means of a stabilizing ring 22 or 24.

In the embodiment illustrated in FIG. 1, every second molding 16 of the first part 10 is provided with an outer chamfer 26, the remaining moldings 14 having an inner chamfer 27. Correspondingly, each second molding 18 of the second part 12, which is located opposite a molding 14 having an inner chamfer 27 of the first part 10, has an outer chamfer 28 and the remaining moldings 20 of the second part 12 have a corresponding inner chamfer 30.

After the two parts 10, 12 of the insulating body have been placed on a stator, they overlap in the region of the inner and outer chamfers 26, 27, 28, 30 in such a way that the moldings 14, 16, 18, 20 of the two parts 10, 12 engage alternatively into one another. This means that when a molding 14 of the first part encompasses a molding 18 of the second part, an adjoining molding 20 of the second part encompasses the corresponding adjoining molding 16 of the first part. This goes to create a particularly intimate contact between the two parts 10, 12 of the insulating body.

Instead of the chamfers 26, 27, 28, 30 shown in FIG. 1, inner and outer rebates can also be provided on the moldings in the region of overlap. It is also possible, for example, to reduce the material thickness of the moldings in the region of overlap in steps, so that after the first and the second part 10, 12 of the insulating body have been joined together, a continuous insulating wall of even thickness is produced.

FIG. 2 shows a perspective, sectioned partial view of a stator body having a device for the insulation of the stator slots according to another embodiment of the invention. In FIG. 2, the two parts 10, 12 of the insulating body are shown joined together and mounted on a stator. It is not possible to identify the transition between the two parts 10, 12 in FIG.

2. In the embodiment of FIG. 2, the insulating body can be designed in the same way as described with reference to FIG. 1; however, it is also possible to design the insulating body so that one of the two parts extends substantially over the entire axial length of the stator, while the other part only covers the end face of the stator that is still open. In all, the poles, or hammers, 32 of the stator are enclosed by the first and the second part 10, 12 of the insulating body, the insulated stator hammers 32 carrying phase windings 34 which form winding heads 36 at the end faces of the stator. The phase winding 34 and the winding heads 36 are only shown schematically in FIG. 2. As in the embodiment illustrated in FIG. 1, the second part 12 of the insulating body has a stabilizing ring 24. In the first part 10 of the insulating body, this stabilizing ring has been replaced by snap hooks 38, 40 which are used to fasten a cover plate 42 over the winding head 36. It is of course self-evident that any other suitable means of connecting the parts 10, 12 to the cover plate 42, for example by providing lugs (not illustrated), is included within the field of the invention.

The cover plate 42 is used to carry the winding wires, to cover the winding head and to delimit the winding space against moving parts of the electric motor that are disposed within the stator. The cover plate 42 has additional means for the purpose of carrying and fastening various electric and electronic components of the electric motor. Thus a channel 44 to receive and carry winding wires is provided on the cover plate 42 and guiding elements 46 to receive and position winding ends are molded onto it. The guiding elements 46 can, for example, be designed in the form of closed or partially open sleeves. Moreover, means of mounting other electronic components of the electric motor, and particularly a circuit board, can be provided on the cover plate 42, as explained in more detail with reference to FIG. 3. By providing the cover plate with a channel 44 to receive and carry the winding wires and additional guiding elements 46 to receive and position the winding ends, it is possible to create an integrated insulating body which takes on the additional function of conducting and combining the winding wires and from which the winding ends can be led out in an orderly manner. This goes to simplify the assembly of the stator as a whole and provides a wound stator whose connection within the electric machine is easier and more clearly laid out than a stator having slot insulation according to the prior art.

FIG. 3 shows a similar view as in FIG. 2, the stator in FIG. 3 being completely closed and a sensor circuit board 48 being mounted on an end face of the stator. Parts corresponding to those in FIG. 2 are indicated by the same reference numbers and are not described again in detail. In FIG. 3, the cover plate 42 mounted on the end face of the stator, which has a channel 44 to receive phase windings, can be identified. Guiding elements 46 for the winding ends are provided on the cover plate 42. Moreover, a circuit board carrier 50 to receive the sensor circuit board 48 is mounted on the cover plate 42. The circuit board carrier 50 can be mounted onto the cover plate 42 as a separate component or integrally formed with the cover plate 42. In the illustrated embodiment, the cover plate 42, the guiding elements 46 and the circuit board carrier 50 are manufactured as a single component, injection molded, for example, from plastics. The two parts 10, 12 of the insulating body are also preferably injection molded from plastics.

The sensor circuit board 48 can, for example, accommodate the sensors needed to measure the rotational position and the electronic components for the control of brushless DC motors.

FIG. 4 shows a longitudinal view through an electric motor in which the device for the insulation of the stator slots according to the invention is deployed. Parts corresponding to those in FIGS. 1 to 3 are indicated by the same reference numbers.

From the longitudinal view through the electric motor shown in FIG. 4, it is possible to schematically identify a shaft 52 having an integrated rotor back yoke 54 and permanent magnets 56 mounted on to the back yoke. The rotor arrangement 54, 56 is inserted into the stator which is schematically illustrated in FIG. 4 through stator hammers 32, the winding 36 and the two parts 10, 12 of the insulating body. The first part 10 of the insulating body carries the cover plate 42, which can receive a sensor circuit board or similar. Moreover, a rotor hub 58 is mounted on the shaft 52, the rotor hub 58 carrying a control magnet 72 to measure the rotor position. A sensor circuit board (not illustrated) is located opposite the control magnet 72, the sensor circuit board carrying, for example, Hall sensors and/or coils for the purpose of measuring the position of the rotor and to derive commutation signals, for example, from the rotor position. The stator and the rotor are enclosed by a housing wall 60 in which a bearing 62 to support the shaft 52 is integrated at the drive end of the shaft 52. A bearing 64, which is integrated into a cover 66 of the motor, is disposed at the opposite end of the shaft 52.

FIG. 4 is used simply as an example for an electric motor in which the device for the insulation of the stator slots according to the invention can be employed, wherein the invention is in no way limited to the illustrated embodiment. The characteristics revealed in the above description, the claims and the figures can be important for the realization of the invention in its various embodiments both individually and in any combination whatsoever.

The invention claimed is:

1. A device for insulation of stator slots of an electric machine that has a stator having a plurality of stator poles and stator slots located between the stator poles, comprising:

an insulating body having moldings adapted to the shape of the stator slots and adaptable to slide onto the stator in an axial direction; and a cover piece connected to an end face of the insulating body, said cover piece carrying and covering windings applied to the insulating body, said windings provided at the end face of the stator, wherein the insulating body has a first and a second part having moldings adapted to the shape of the stator slots, which can be slid onto the stator on both sides in an axial direction, each part of the insulating body being dimensioned in the axial direction so that the moldings of the first part and second part adapted to the stator slots extend at least partially over the axial length of the stator slots and overlap the second part and first part, respectively, in the axial direction, wherein a first group of moldings of the first part engage into the moldings of the second part located opposite, and a second group of moldings of the first part envelop a distal end of moldings of the second part located opposite.

2. A device according to claim 1, wherein one of said first group of moldings is adjacent to one of said second group of moldings.

3. A device for insulation of stator slots of an electric machine that has a stator having a plurality of stator poles and stator slots located between the stator poles comprising:

an insulating body having moldings adapted to the shape of the stator slots and adaptable to slide onto the stator in an axial direction; and a cover piece connected to an end face of the insulating body, said cover piece carrying and covering windings applied to the insulating body, said windings provided at the end face of the stator, wherein the cover piece has a means to mount a circuit board.

4. A device according to claim 3, wherein the cover piece comprises an annular cover plate that is held on the insulating body with a spacing to the moldings.

5. A device according to claim 3, wherein the cover piece has a channel to carry winding wires.

6. A device according to claim 3, wherein the cover piece has means to fasten winding wire ends and to allow them to be lead out.

7. A device according to claim 3, wherein the cover piece is connected to the insulating body by means of snap hooks.

8. A device according to claim 3, wherein the insulating body and the cover piece comprise injection molded plastic parts.

9. A device for insulation of stator slots of an electric machine that has a stator having a plurality of stator poles and stator slots located between the stator poles, comprising a two-piece insulating body that has a first and a second part having moldings adapted to the shape of the stator slots, which can be slid onto both sides of the stator in an axial direction, each part of the insulating body being dimensioned in the axial direction so that the moldings of the first part and second part adapted to the stator slots extend at least partially over the axial length of the stator slots and overlap the second part and first part, respectively, in the axial direction, wherein a first group of moldings of the first part engage into the moldings of the second part located opposite, and a second group of moldings of the first part envelop a distal end of moldings of the second part located opposite.

10. A device according to claim 9, wherein in the region of overlap, the moldings of the first group of the first part have an inner chamfer and the moldings of the second part located opposite have an outer chamfer and the moldings of the second group of the first part have an outer chamfer and the moldings of the second part located opposite have an inner chamfer.

11. A device according to claim 9, wherein in the region of overlap, the moldings of the first group of the first part have an outer rebate and the moldings of the second part located opposite have an inner rebate and the moldings of the second group of the first part have an inner rebate and the moldings of the second part located opposite have an outer rebate.

12. A device according to claim 9, wherein the moldings of the first group and the moldings of the second group are disposed alternately alongside one another.

13. A device according to claim 9, wherein a cover piece that can be connected to an end face of the first or second part of the insulating body in order, after windings have been applied to the insulating body, to carry the windings at the end face of the stator and to cover them.

14. A device according to claim 13, wherein the cover piece has a channel to carry winding wires.

15. A device according to claim 13, wherein the cover piece has means to mount a circuit board.

16. A device according to claim 13, wherein the cover piece has means to fasten winding wire ends.

17. A device according to claim 13, wherein the insulating body comprises two injection molded plastic parts.

18. A device according to claim 9, wherein one of said first group of moldings is adjacent to one of said second group of moldings.

* * * * *